United States Patent [19]
Collins, Jr.

[11] 3,747,778
[45] July 24, 1973

[54] SNOWMOBILE HOIST

[76] Inventor: Emmit L. Collins, Jr., 101 Avis Ct., Pinconning, Mich. 48650

[22] Filed: Sept. 8, 1971

[21] Appl. No.: 178,700

[52] U.S. Cl............... 214/1 A, 214/83.24, 214/152
[51] Int. Cl............................................... B60p 1/00
[58] Field of Search.................. 214/146.5, 148, 1 A, 214/313, 318, 152, 517

[56] References Cited
UNITED STATES PATENTS
| 947,902 | 2/1910 | Glise | 214/46.32 |
| 2,870,927 | 1/1959 | Warren | 214/313 |

Primary Examiner—Gerald M. Forlenza
Assistant Examiner—Frank E. Werner
Attorney—Learman & McCulloch

[57] ABSTRACT

Hoisting apparatus for machines, such as snowmobiles and the like, comprising a frame having vertically, forwardly inclined support rails, a cradle for supporting the front end of a machine slidably mounted on the support rails for movement in a forwardly and upwardly inclined path of travel to a raised position, and a winch mounted on the frame, including a windable cable connectable with the rear end of the machine for lifting the rear end of the machine while simultaneously driving the machine forwardly to move the front end of the machine in the inclined path of travel to the raised position and then swinging the rear end of the vehicle about its forward end to an elevated position.

9 Claims, 5 Drawing Figures

PATENTED JUL 24 1973 3,747,778

INVENTOR
EMMIT L. COLLINS JR.
BY Learman & McCulloch
ATTORNEYS 3,747,778

SNOWMOBILE HOIST

FIELD OF THE INVENTION

This invention relates to apparatus for lifting vehicles such as snowmobiles and the like, and more particularly to lifting apparatus which will lift the vehicle in such a manner as to expose the underside thereof so that it is easily accessible to a repairman.

BACKGROUND OF THE INVENTION

Snowmobiles are conventionally driven by an endless track engageable with the surface being traversed. Heretofore, the repair of such track has been a tedious process, because the track is relatively inaccessible to the repairman when the vehicle is on the ground and conventional automobile hoists do not readily lend themselves to the relatively small snowmobiles. In addition, the expense normally associated with automobile hoists is not warranted for a snowmobile dealer or repairman. Accordingly, it is an object of the present invention to provide lifting apparatus for machines, such as snowmobiles and the like, which will facilitate easy access to the underside of the machine.

It is another object of the present invention to provide apparatus which will lift the forward end of a vehicle to a position slightly above the ground and also lift the rear of the vehicle to an elevated position relative to the elevated forward end.

Other objects and advantages of the present invention will become apparent to those of ordinary skill in the art as the description thereof proceeds.

SUMMARY OF THE INVENTION

Apparatus for lifting a snowmobile vehicle, and the like, to an elevated position comprising a frame including vertically, forwardly inclined support means, means for supporting one end of a vehicle slidably mounted on the support means for movement in an upwardly and forwardly directed path of travel between a lowered position and a raised position to move the front end of the vehicle between a lowered, ground supported position and a raised position, and means reactable between the frame and the rear end of the vehicle for elevating the rear end of the vehicle and simultaneously urging the vehicle forwardly and upwardly to move the support means and the front end of the vehicle between the lowered and raised positions.

The present invention may more readily be described by reference to the accompanying drawings in which.

DESCRIPTION OF THE PREFERRED EMBODIMENT

Figure 1:
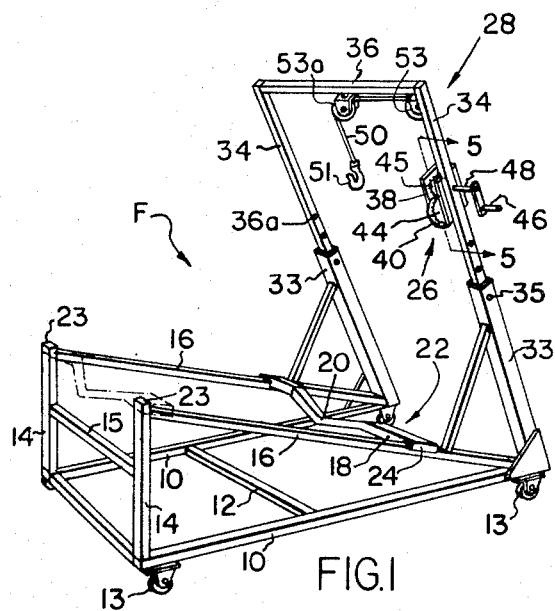
FIG. 1 is a perspective view of apparatus constructed according to the present invention, with the snowmobile support cradle being illustrated in solid lines in its lowermost position and in chain lines in its uppermost position.

Apparatus constructed according to the present invention is particularly adapted for use with a snowmobile, generally designated S, having a hull H, a seat 7 on which the operator sits, a back rest 8, and an endless drive track 9 driven by suitable drive sprocket wheels 11, as usual.

Apparatus constructed according to the present invention includes a portable frame, generally designated F, including a pair of side rails 10 spanned by cross rails 12 and supported on the surface to be traversed by a plurality of casters 13. A pair of vertical end members 14 are fixed to the side members 10 and are spanned by a cross rail 15. A pair of vertically, forwardly inclined tracks 16 are provided on opposite sides of the frame and are supported by the side frame members 10 and the vertical end members 14.

Figure 4:
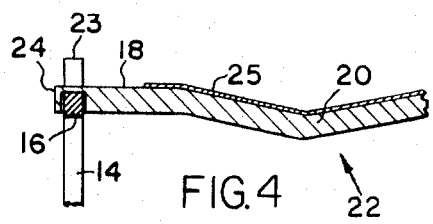
FIG. 4 is a fragmentary, sectional end view taken along the line 4—4 of FIG. 2, and particularly illustrating the cradle only for supporting the snowmobile.

Spanning the tracks 16 is a hull-supporting cradle, generally designated 22, including a transverse support rail 18 having a pair of lateral end guides 24 (FIG. 4) slidably received on the tracks or side rails 16. The support rail 18 includes a V-shaped mid-section 20 for receiving the generally complementally shaped underside of the snowmobile hull H. A resilient pad 25 is provided on the mid-section 20 of the cradle 22 to prevent the underside of the snowmobile hull H from being marred by the cross rail 18. A pair of end stops, generally designated 23, are mounted at the forward ends of the rails 16 for interrupting the movement of the cradle 22 in its forward path of travel.

The frame F also includes a pair of hollow, vertically, forwardly inclined, pipes 33 supported on the side rails 10 and telescopically receiving a pair of side legs 34, spanned by a cross member 36. The side legs 34 and cross member 36 constitute an inverted U-shaped support member, generally designated 28. A plurality of vertically spaced locating holes 36a are provided in each of the legs 34 to receive a locating pin 35 which is also received by an aligned aperture provided in the associated pipe 33 to adjustably control the vertical position of the U-shaped portion 28. It is important to note that the cross bar 36 of the U-shaped support member 28 is located a substantial distance forwardly of the rear of the machine for a purpose which will become apparent hereinafter.

Figure 2:
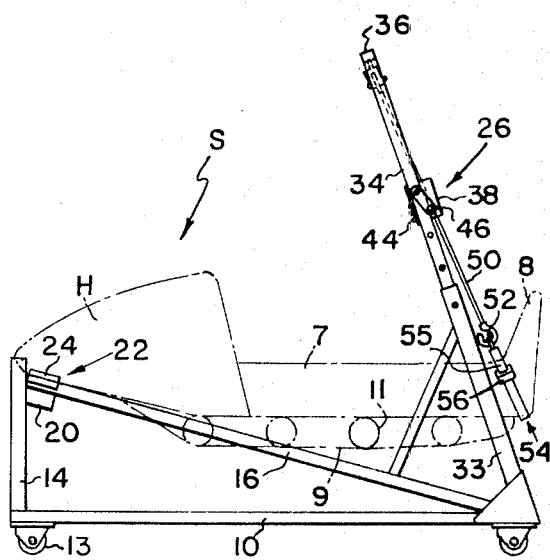
FIG. 2 is a side elevational view of apparatus constructed according to the present invention, with a snowmobile positioned thereon in an intermediate position of elevation.

For elevating the snowmobile S from a ground supported position to an elevated position, a winch assembly, generally designated 26, is provided and includes a winch support member 38 fixed to one of the legs 34 and journaling a cross shaft 42. A drum 40, carrying a ratchet wheel 44, is fixed to the shaft 42. A cable 50 is wound upon the drum 40 and passes through a pair of swivel pulleys 53 and 53a swingably mounted on the cross rail 36 of the U-shaped support member 28. A hook 51 is provided on the end of the cable 50 and is received by an eye 52 connected to the webbing 55 of an adjustable harness, generally designated 54, which includes removably coupled disconnect members 56 to facilitate passage of the webbing under the rear of the snowmobile as shown in FIG. 2.

Figure 5:
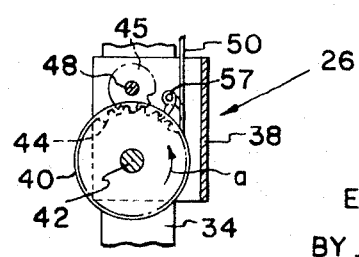
FIG. 5 is a sectional side view taken along the line 5—5 of FIG. 1, and particularly illustrating the winch mechanism for raising the vehicle.

The ratchet wheel 44 is driven by a gear 45 fixed to the end of a shaft 48 that is journaled in the winch support 38. A hand crank 46 is fixed to the opposite end of the shaft 48 for turning the gear 46. The ratchet wheel 44 is held against rotation in a counterclockwise direction, indicated by the arrow *a* (FIG. 5), by a pawl 57 pivotally mounted on the winch support member 38 between a raised inoperative position, illustrated in chain lines in FIG. 5, and a lowered operative position illustrated in solid lines in FIG. 5.

THE OPERATION

The hoist is moved adjacent a snowmobile S positioned on the ground and the cradle 22 is moved to the lowermost position shown in FIG. 1 so that it will engage the underside of the hull H. The snowmobile supporting webbing 55 is wrapped around the underside of the snowmobile and the disconnect members 56 are coupled together. The cable hook 51 is then passed through the eye 52 in the webbing 55.

The hand crank 46 is then turned to wrap the cable 50 on the drum 40 to raise the rear of the snowmobile. Since the pulley 53*a* is a substantial distance forward of the rearward portion of the snowmobile S, the pulling force on the cable 50 will have a vertical, as well as a horizontal, component. The rails 18 are inclined such that as the rear of the vehicle is raised, the horizontal force component will drive the machine forwardly and the cradle 22 and the machine supported thereon will slide upwardly and forwardly on the rails 16 so that the snowmobile remains substantially horizontal until it reaches the forwardmost position shown in FIG. 2 and the cradle 22 engages the stops 23. The hand crank 46 is continually operated to turn the drum 40 to swing the rear of the snowmobile S upwardly about the cradle 22 to move the machine from the position shown in FIG. 2 to the position shown in FIG. 3. Because the cross bar 36 is substantially forwardly of the rearward end of the side rails 10, the back of the seat 8 is positioned rearwardly of the cross rail 36 to achieve maximum lifting height.

Figure 3:
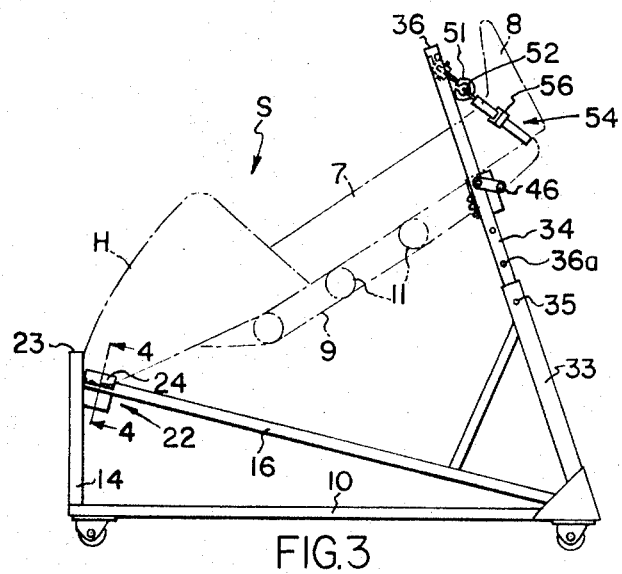
FIG. 3 is a side elevational view similar to FIG. 2, but illustrating a snowmobile in the fully elevated position.

To lower the machine from the position shown in FIG. 3 to a ground-engaging position, the pawl 57 is moved to the chain line position and the hand crank 46 is turned in the opposite direction. The rear end of the machine will be lowered until it is at the same vertical position as is the front of the machine, in the position shown in FIG. 2. As the cable 50 continues to be unwound from the drum 40, the cradle 22 and the machine supported thereon will slide downwardly on the rails 16 until the machine is on the ground.

It should be understood that this apparatus can also be used to move other types of vehicles, such as motorcycles, to such an inverted position by slightly modifying the cradle 22 to provide a U-shaped wheel receiving frame.

It is to be understood that the drawings and descriptive matter are in all cases to be interpreted as merely illustrative of the principles of the invention, rather than as limiting the same in any way, since it is contemplated that various changes may be made in various elements to achieve like results without departing from the spirit of the invention or the scope of the appended claims.

What I claim is:

1. Apparatus for lifting a machine, such as a snowmobile and the like, comprising:
   laterally spaced, vertically, forwardly inclined support means;
   cradle means for supporting one end of said machine spanning said support means and being longitudinally movable thereon in an upwardly and forwardly directed path of travel between a lowered position and a raised position;
   means reactable between said frame and the other end of said machine for raising said other end and simultaneously urging the machine upwardly and forwardly toward said cradle means to move said machine and said cradle means on said support means between said lowered and raised positions; and
   means for interrupting the forward movement of said cradle means in said raised position,
   said reactable means including means for swinging the other end of said machine to a further raised position relative to said one end and said interrupted cradle means.

2. The apparatus of claim 1 wherein said cradle means is mounted to remain stationary when said other end is swung to said further raised position so that said machine swings relative to said cradle means.

3. Apparatus for lifting a machine, such as a snowmobile and the like, comprising:
   a frame including vertically, forwardly inclined support means;
   upwardly opening cradle means for supporting one end of said machine mounted on said support means for movement in an upwardly and forwardly directed path of travel between a lowered position and a raised position;
   means reactable between said frame and the other end of said machine for raising said other end and simultaneously urging the machine forwardly and upwardly toward said cradle means to move said upwardly opening cradle means and said machine between said lowered and raised positions; and
   means for interrupting the forward movement of said cradle means in said raised position,
   said reactable means including means for swinging the other end of said machine to a further raised position relative to said one end and said interrupted cradle means.

4. The apparatus set forth in claim 3 wherein said cradle means is mounted so that the longitudinal orientation of said cradle means remains substantially constant when said other end is swung.

5. The apparatus of claim 3 wherein said frame means comprises a first vertically forwardly inclined frame section, a second vertically forwardly inclined frame section vertically adjustably mounted on said first frame section; said moving means reacting between said second frame section and said vehicle.

6. The apparatus of claim 3 wherein said means for moving the other end of said machine includes means mounted on said frame above and interjacent the forward and rearward ends of said support means to exert vertical forces on said machine tending to move it upwardly and horizontal forces tending to move it forwardly.

7. Apparatus for lifting a machine, such as a snowmobile and the like, comprising:
   a frame including vertically, forwardly inclined support means;
   means for supporting one end of said machine mounted on said support means for movement in an upwardly and forwardly directed path of travel between a lowered position and a raised position,
   means reactable between said frame and the other end of said machine for raising said other end and simultaneously urging the machine forwardly and upwardly to move the support means and said machine between said lowered and raised positions while maintaining the machine substantially horizontal; and means for interrupting the forward path of travel of said support means in said raised position.

8. A method of lifting and positioning a vehicle comprising the steps of:

moving the vehicle upwardly and forwardly along an upwardly inclined path of travel to a raised position while maintaining the position of said vehicle substantially horizontal;

interrupting forward movement of the leading end of said vehicle; and then swinging the trailing end of the vehicle to a raised position relative to the interrupted forward end to provide access to the underside of the vehicle.

9. A method of lifting and positioning a vehicle comprising the steps of:

supporting one end of the vehicle on an upwardly opening cradle and moving the vehicle and cradle upwardly and forwardly in an upwardly inclined path of travel to a raised position;

blocking the forward path of travel of the cradle in the raised position; and swinging the trailing end of the vehicle about the blocked cradle to a raised position relative to the forward end and said cradle while maintaining the horizontal orientation of said upwardly opening cradle substantially constant.

* * * * *

UNITED STATES PATENT OFFICE
CERTIFICATE OF CORRECTION

Patent No. 3,747,778     Dated July 23, 1973

Inventor(s) Emmit L. Collins, Jr.

It is certified that error appears in the above-identified patent and that said Letters Patent are hereby corrected as shown below:

In column 3, line 64, before "laterally" add --a frame including--.

In column 4, delete "interrupted" bridging lines 14 and 15 and lines 39 and 40; lines 15 and 40, after "means" insert --in said raised position--; line 41, delete "wherein" and insert --including means mounting--; line 42, delete "is mounted"; line 44, delete "when" and insert --as--; line 46, delete "means"; line 49, cancel "moving" and insert --reactable--; line 50, change "vehicle" to --machine--; line 51, before "means" insert --reactable--; line 52, delete "moving" and insert --raising--; line 63, before "means" insert --movable support--.

In column 5, line 2, change "the" to --said movable--; line 7, before "support" insert --movable--.

In column 6, line 1, delete "interrupted"; after "end" insert --when the movement of the forward end is interrupted--.

Signed and sealed this 31st day of December 1974.

(SEAL)
Attest:

McCOY M. GIBSON JR.
Attesting Officer

C. MARSHALL DANN
Commissioner of Patents